US008885472B2

(12) United States Patent
Kwan et al.

(10) Patent No.: US 8,885,472 B2
(45) Date of Patent: Nov. 11, 2014

(54) SCALING OUTPUT-BUFFERED SWITCHES

(75) Inventors: Bruce Kwan, Sunnyvale, CA (US);
Brad Matthews, San Jose, CA (US);
Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 253 days.

(21) Appl. No.: 13/523,931

(22) Filed: Jun. 15, 2012

(65) Prior Publication Data

US 2013/0336332 A1  Dec. 19, 2013

(51) Int. Cl.
| G08C 15/00 | (2006.01) |
| H04L 12/28 | (2006.01) |
| H04L 12/54 | (2013.01) |
| G06F 15/16 | (2006.01) |
| G06F 15/173 | (2006.01) |
| G06F 3/00 | (2006.01) |
| G06F 5/00 | (2006.01) |
| H04L 12/801 | (2013.01) |
| H04L 12/861 | (2013.01) |

(52) U.S. Cl.
CPC ............... *H04L 47/10* (2013.01); *H04L 49/90* (2013.01)
USPC ........... 370/231; 370/235; 370/413; 370/429; 709/232; 709/238; 710/29; 710/36; 710/52

(58) Field of Classification Search
CPC ......... H04L 47/10; H04L 47/30; H04L 47/11; H04L 47/12; H04L 12/5695; H04L 47/15; H04L 47/2441; H04L 29/06; H04L 49/90; H04L 49/30; H04L 45/00; H04L 12/5693; H04L 47/1004; H04L 45/16; H04L 12/185; H04L 12/18; H04L 49/201; H04L 29/0653; H04L 49/3009; H04L 12/5602; H04L 29/06027; H04L 29/08072; H04L 29/08117; H04L 29/08144; H04L 29/12009; H04L 47/27; H04L 47/32; H04L 49/254; H04L 49/901; H04L 49/3018; H04L 49/101; H04L 47/01; H04Q 11/0478; G06F 3/0607; G06F 3/0613; G06F 3/0659; G06F 3/0689; G06F 5/06; G06F 13/28; G06F 13/385; G06F 5/10
USPC ......... 370/229, 230, 390, 392, 412, 413, 417, 370/419, 429, 462, 231, 235; 710/20, 39, 710/58, 112, 310, 29, 36, 52; 709/232, 238
See application file for complete search history.

(56) References Cited

U.S. PATENT DOCUMENTS 7,415,477 B2 * 8/2008 Devadas et al. .................. 1/1
7,558,197 B1 * 7/2009 Sindhu et al. ............. 370/230

* cited by examiner

*Primary Examiner* — Alpus H Hsu
*Assistant Examiner* — Dharmesh Patel
(74) *Attorney, Agent, or Firm* — Oblon, Spivak, McClelland, Maier & Neustadt, L.L.P.

(57) ABSTRACT

The systems and methods described herein allow for the scaling of output-buffered switches by decoupling the data path from the control path. Some embodiment of the invention include a switch with a memory management unit (MMU), in which the MMU enqueues data packets to an egress queue at a rate that is less than the maximum ingress rate of the switch. Other embodiments include switches that employ pre-enqueue work queues, with an arbiter that selects a data packet for forwarding from one of the pre-enqueue work queues to an egress queue.

15 Claims, 4 Drawing Sheets

SCALING OUTPUT-BUFFERED SWITCHES

BACKGROUND

1. Field of the Disclosure

The present disclosure relates generally to packet-switching networks and, more particularly, to systems and methods for scaling output-buffered switches.

2. Description of Related Art

Packet-switching networks include output-buffered switches, which exhibit relatively low latencies. As network demands increase (e.g., in data centers, or in cloud-computing systems), it becomes desirable to scale these output-buffered switches. However, the task of scaling these output-buffered switches is quite challenging, and overcoming that challenge is neither trivial nor intuitive.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
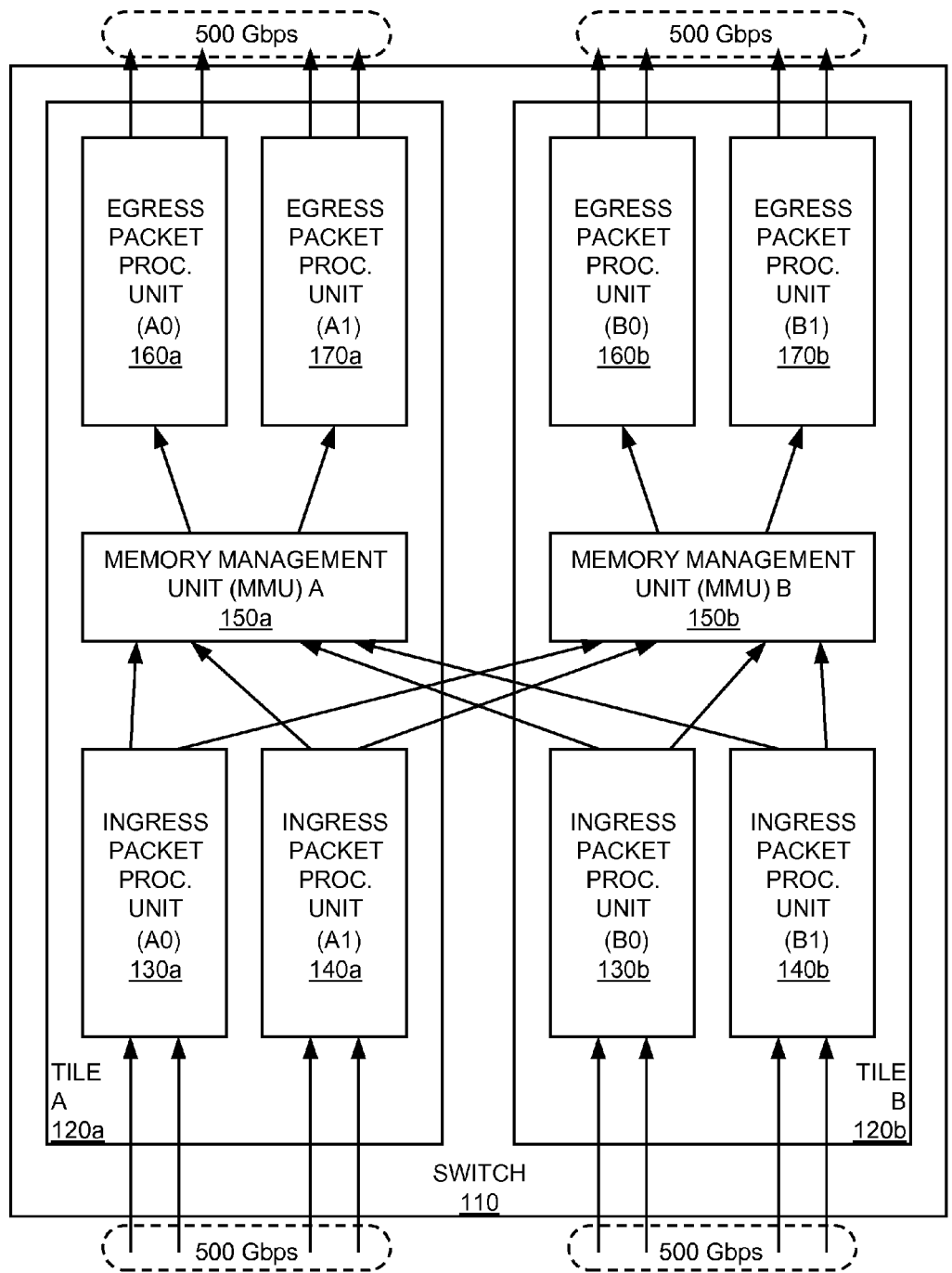
FIG. 1 is a block diagram showing one embodiment of a scalable output-buffered switch.

Output-buffered switches exhibit low latencies and other performance advantages, which are useful for data centers and cloud-computing systems. As network traffic increases in these systems, it becomes desirable to scale these output-buffered switches. Unfortunately, scaling output-buffered architectures is quite challenging because of the way in which control structures for these output-buffered switches scale. These control structures address linking of packets to egress port queues, as well as managing admission control in the packet-switching networks.

The systems and methods described herein allow for the scaling of output-buffered switches by decoupling the data path from the control path. In doing so, one observation that is not intuitive is that the rate in which egress queues are enqueued (i.e., the enqueuing rate) need not match a maximum ingress rate of the output-buffered switch. This is because a dequeue rate for a given egress port is fixed (based on the port speed). Stated differently, the data packets need not be linked to the egress queues at the same rate that the data packets enter the switch. Instead, an enqueuing rate that is slightly greater than a maximum rate at which the egress queue dequeues (i.e., the maximum dequeue rate) is sufficient. Thus, for example, if the maximum incoming bandwidth for the output-buffered switch is about two (2) billion packets per second (Bpps), but the egress queue only dequeues at a maximum rate of about five hundred (500) million packets per second (Mpps), then providing an enqueuing rate that is slightly greater than 500 Mpps is sufficient to keep the egress queues filled. In short, it is not necessary to link all of the packets to the egress queues at a rate of 2.8 Bpps, even though the maximum ingress rate may be 2.8 Bpps.

Given this, some embodiment of the invention include a switch with a memory management unit (MMU), in which the MMU enqueues data packets to an egress queue at a rate that is less than the maximum ingress rate of the switch. Other embodiments include switches that employ pre-enqueue work queues, with an arbiter that selects a data packet for forwarding from one of the pre-enqueue work queues to an egress queue. By employing a pre-enqueue work queue, further efficiencies can be achieved by dropping data packets as they enter (or exit) the pre-enqueue work queue if the MMU determines that the egress queue is in a discard state. This is because those data packets will eventually be discarded and, by prospectively dropping the data packets, the switch conserves enqueuing resources.

As one can see, decoupling the control path from the data path allows for scaling of output-buffered switches without enqueuing data packets at the maximum ingress rate.

With all of this said, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a block diagram showing one embodiment of a scalable output-buffered switch 110. In the embodiment of FIG. 1, the switch 110 comprises a first tile (Tile A) 120a and a second tile (Tile B) 120b. For purposes of illustration, the switch 110 is shown with a maximum input rate of one (1) terabits per second (Tbps), with each tile 120a, 120b receiving data at about 500 gigabits per second (Gbps). Also, with four (4) egress queues, each egress queue dequeues at a maximum dequeue rate of about 250 Gbps. Translating this from bits to Ethernet packets, the maximum input rate is about 1.5 Bpps, with each egress queue having a maximum dequeue rate of about 375 Mpps.

The first tile 120a has a pair of ingress packet-processing (PP) units 130a, 140a (shown as A0 and A1). Similarly, the second tile 120b has ingress PP units 130b, 140b (shown as B0 and B1). Each of the ingress PP units 130a, 130b, 140a, 140b can be seen as comprising an ingress queue (or ingress buffer) for receiving data packets.

The first tile 120a also has a memory management unit (MMU-A) 150a, which is coupled to the ingress PP units 130a, 130b, 140a, 140b, thereby allowing the MMU-A 150a to receive data packets from the ingress units 130a, 130b, 140a, 140b of both tiles 120a, 120b. In other words, the MMU-A 150a can receive data packets from the ingress queues of both tiles 120a, 120b. Similarly, the second tile 120b has a MMU-B 150b, which can likewise receive data packets from the ingress units 130a, 130b, 140a, 140b, allowing the MMU-B 150b to handle data packets from the ingress queues of both tiles 120a, 120b. Since the illustrative ingress rate was chosen to be 1.92 Tbps, one can readily see that the maximum input rate to the MMUs 150a, 150b for this example is 1.92 Tbps.

For the embodiment of FIG. 1, the first tile 120a further includes two egress PP units 160a, 170a (shown as A0 and A1), and the second tile 120b likewise has two egress PP units 160b, 170b (shown as B0 and B1). The egress A0 160a and A1 170a receive data packets from the MMU-A 150a, while the egress B0 160b and B1 170b receive data packets from the MMU-B 150b. Insofar as each of the egress PP units 160a, 160b, 170a, 170b comprises an egress queue, the MMUs 150 also function to enqueue the egress queues. As shown in the embodiment of FIG. 1, since the MMUs 150 have four (4) inputs and two (2) outputs, the MMUs can perform four (4) data write operations and two (2) data read operations per clock cycle. As for the control structures, each MMU 150a, 150b performs four (4) write operations and one (1) read operation per clock cycle for each egress PP unit 160a, 160b, 170a, 170b or egress queue. In other words, at each clock cycle the MMUs 150a, 150b link the data packets to the egress queues and perform egress admission checks for device pool, service pool, port, queue, etc.

Given that the maximum ingress data rate is about two (2) Bpps, one would think that the MMUs 150a, 150b would need to manage the control structures at the same rate of two (2) Bpps, which is an unnecessarily-high enqueue rate. However, since each egress queue has a maximum dequeue rate of 500 Mpps, the MMUs 150a, 150 can sufficiently occupy the egress queues by processing the control structures and enqueing the egress queues at an enqueuing rate that is slightly higher than 500 Mpps. In other words, for the scalable output-buffered switch 110 of FIG. 1, the enqueuing rate for the egress queues can be less than the maximum ingress rate, as long as the enqueing rate is slightly higher than the maximum dequeuing rate of the egress queues. And, all of this can be achieved with minimal-to-no degradation in throughput.

Figure 2:
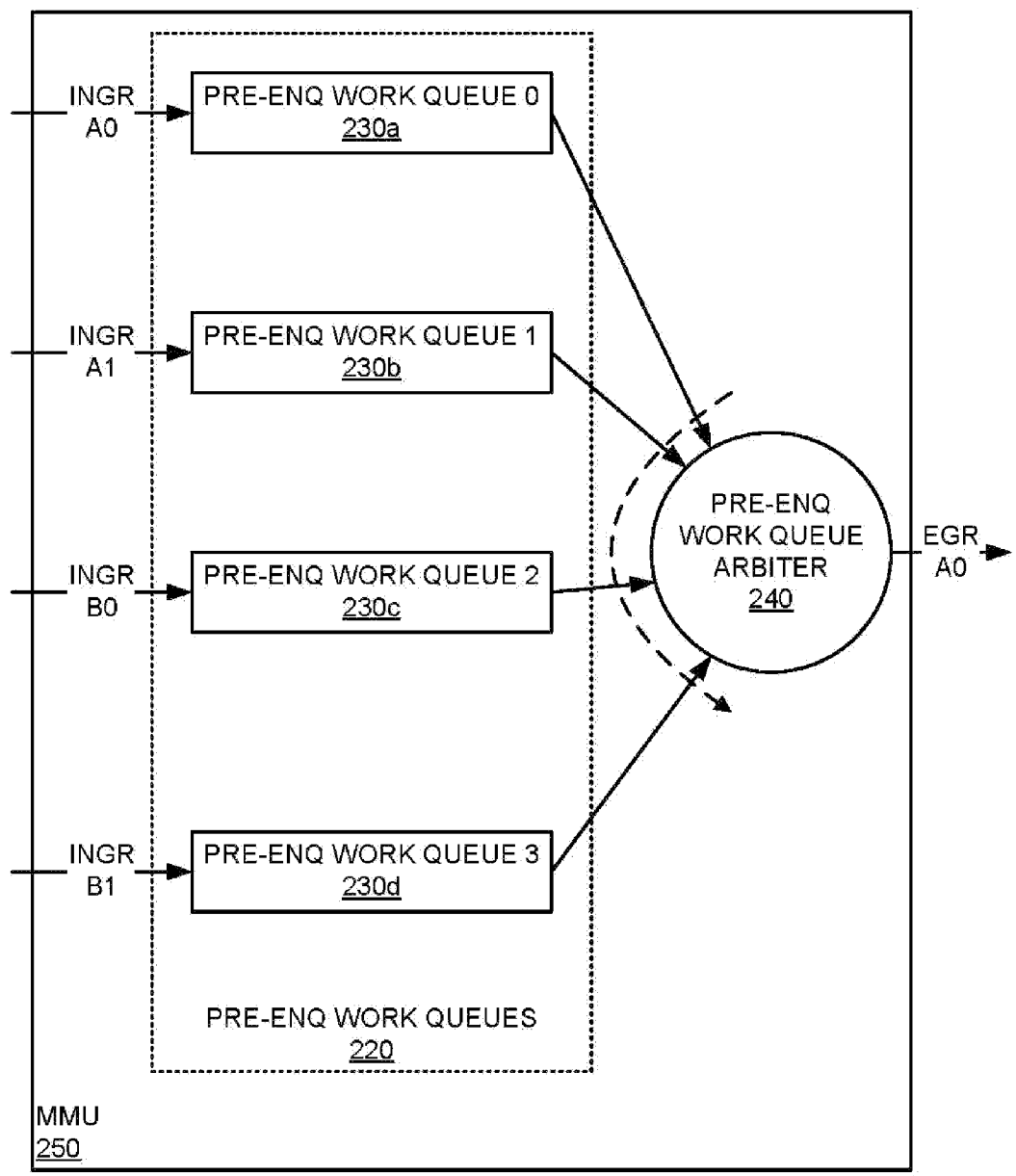
FIG. 2 is a block diagram showing one embodiment of a memory management unit (MMU) in a scalable output-buffered switch.

FIG. 2 is a block diagram showing one embodiment of a MMU 250. As shown in FIG. 2, the MMU 250 comprises a set of pre-enqueue work queues 220, and a pre-enqueue work queue arbiter 240. For illustrative purposes, the embodiment of FIG. 2 shows four (4) pre-enqueue work queues 230a, 230b, 230c, 230d in the set 220.

The first pre-enqueue work queue 230a as receives packet descriptors for the data packets from the ingress A0 130a (FIG. 1) and stores the packet descriptor for eventual arbitration and selection by the arbiter 240. Similarly, the second pre-enqueue work queue 230b receives and stores packet descriptors from the ingress A1 140a (FIG. 1); the third pre-enqueue work queue 230c receives and stores packet descriptors from the ingress B0 130b (FIG. 1); and the fourth pre-enqueue work queue 230d receives and stores packet descriptors from the ingress B1 130b (FIG. 1). These pre-enqueue work queues 230a, 230b, 230c, 230d buffer the packet descriptors from each ingress A0 130a, ingress A1 140a, ingress B0 130b, and ingress B1 140b.

At each clock cycle, the arbiter 240, which is coupled to the pre-enqueue work queues 230a, 230b, 230c, 230d, selects a packet descriptor from one of the pre-enqueue work queues for enqueuing to the egress A0 160a (FIG. 1) (or egress A1 170a (FIG. 1), or B0 160b (FIG. 1), or B1 170b (FIG. 1), depending on which egress queue is determined to be the corresponding egress queue for the selected data packet). For some embodiments, this can be done in a round-robin fashion. With this configuration, and given the illustrative data rates used in FIG. 1, the packet descriptors arrive at the pre-enqueue work queues 220 at a rate of about 2.8 Bpps, but the selected packet descriptor leaves the arbiter 240 at a rate of about 500 Mpps. As one can see from the embodiment of FIG. 2, the set of pre-enqueue work queues 220 coupled with an arbiter 240 readily permits scaling of the output-buffered switch by allowing the switch to decouple its data path from its control path.

Figure 3:
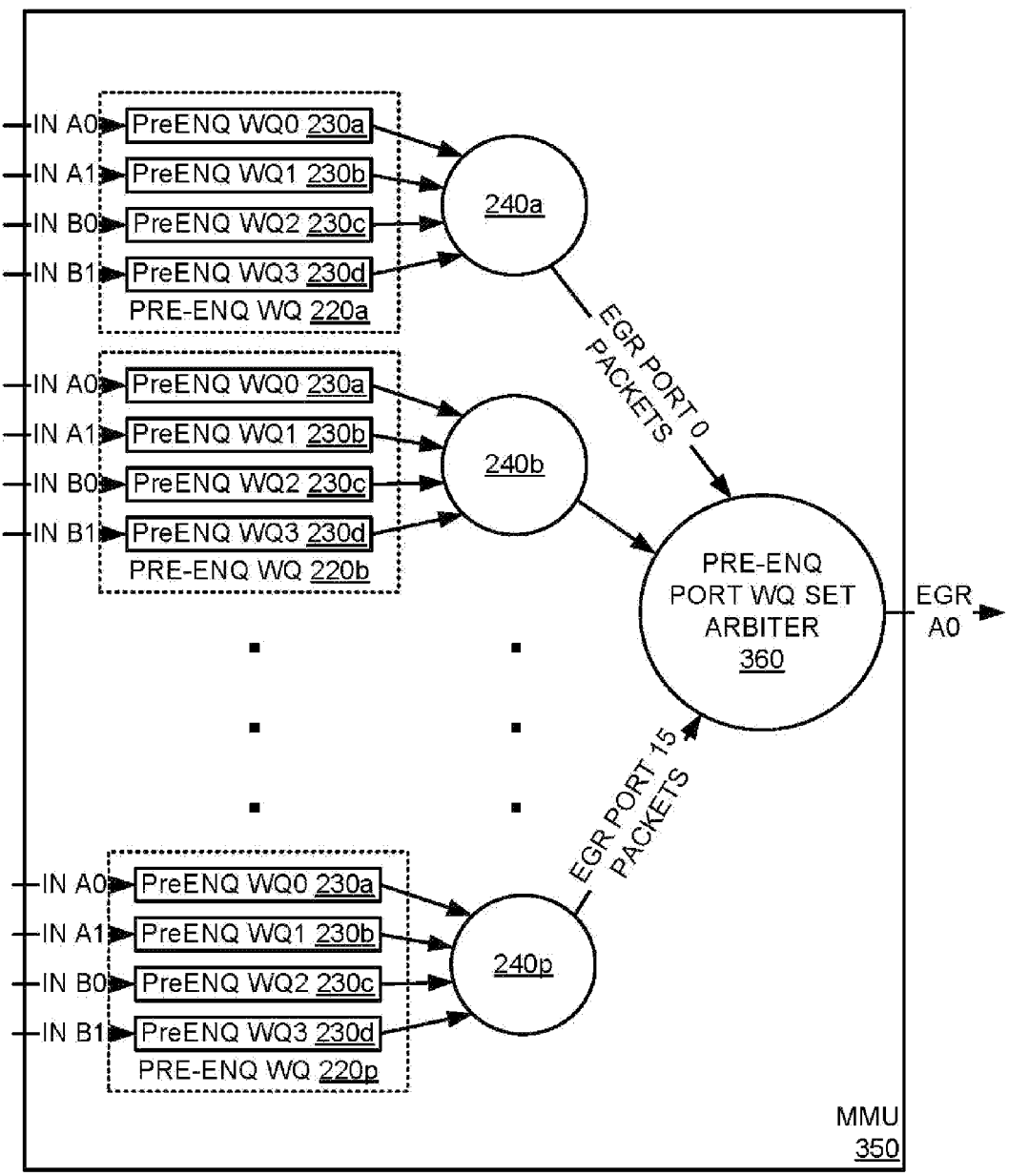
FIG. 3 is a block diagram showing another embodiment of an MMU in a scalable output-buffered switch.

FIG. 3 is a block diagram showing another embodiment of an MMU 350 in a scalable output-buffered switch. Unlike the embodiment of FIG. 2, the embodiment of FIG. 3 shows a port-based enqueue engine with two (2) arbitration stages. This two-stage arbitration mechanism is designed to remedy a particular problem where data packets from multiple ingress queues are destined for the same egress queue.

By way of example, in a sixteen (16) port system, presume that data packets from ingress A0, A1, and B0 are destined for the same egress port (e.g., port 0), while data packets for ingress B1 are destined for the other egress ports (e.g., port 1-port 15). For this type of scenario, pre-enqueue work queue 0, pre-enqueue work queue 1, and pre-enqueue work queue 2 would be serviced one (1) out of sixteen (16) times, while pre-enqueue work queue 3 would be serviced fifteen (15) out of sixteen (16) times. This type of imbalanced distribution can result in line-rate issues. The embodiment of FIG. 3 provides one approach to remedying this type of problem.

As shown in FIG. 3, the pre-enqueue work queues 220a . . . 220p provide their packet descriptors to corresponding pre-enqueue work queue arbiters 240a . . . 240p. Each pre-enqueue work queue arbiter 240a . . . 240p selects a packet descriptor and provides the selected packet descriptor to a pre-enqueue port work queue set arbiter 360. The set arbiter 360 then selects one of those packet descriptors and enqueues its corresponding data packet to the egress queue (shown in FIG. 3 as egress A0). While this type of double-arbitration scheme may result in an added layer of complexity, as well as creating a possibility for priority inversion (where a higher priority packet is placed behind a lower priority packet), the double-arbitration scheme of FIG. 3 eliminates the above-described imbalanced-service problem.

Figure 4:
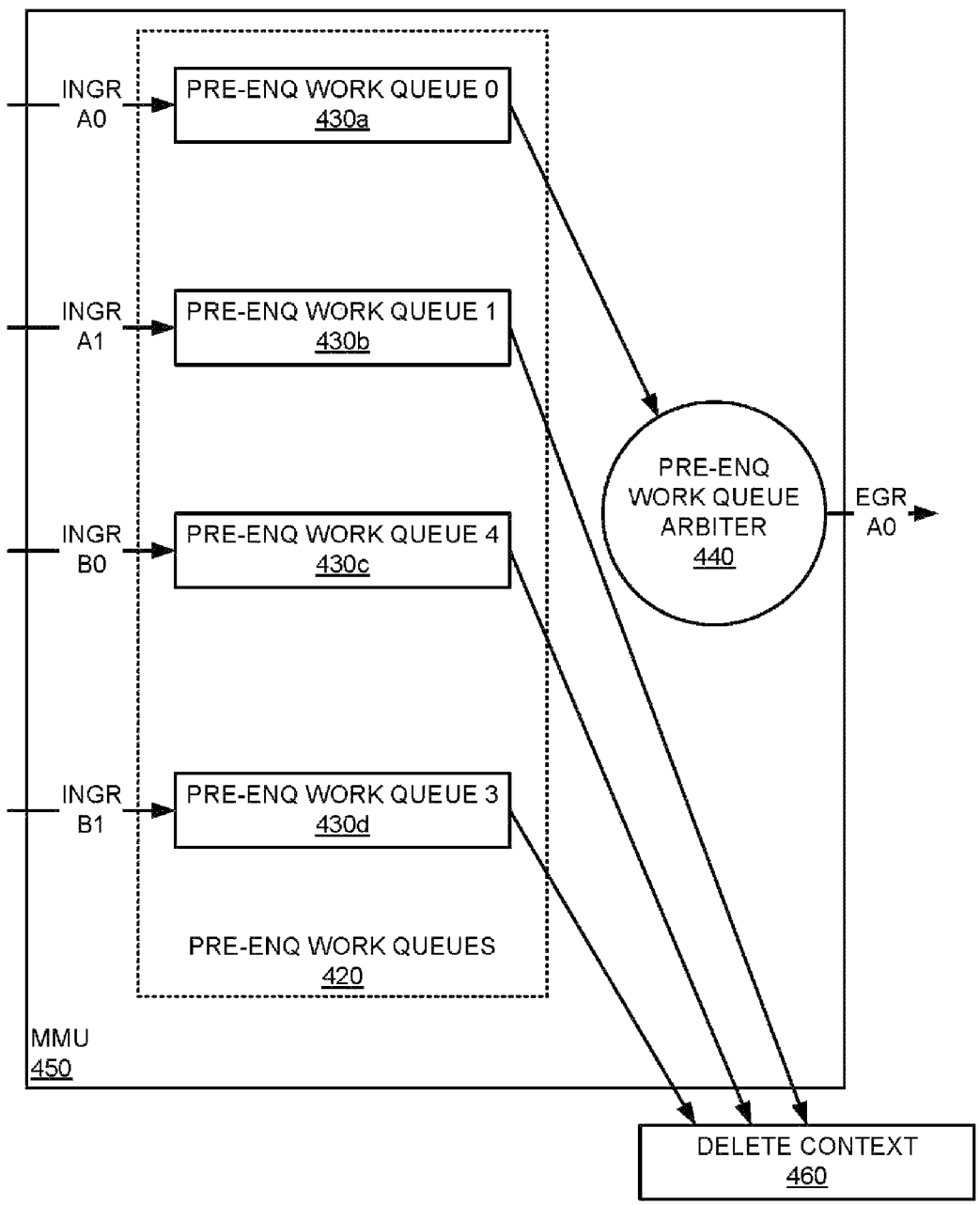
FIG. 4 is a block diagram showing another embodiment of an MMU in a scalable output-buffered switch, where packets are dropped before being enqueued to an egress queue in a discard state.

FIG. 4 is a block diagram showing another embodiment of an MMU 450 in a scalable output-buffered switch, where packets are dropped before being enqueued to an egress queue in a discard state. As shown in FIG. 4, the MMU 450 comprises a set of pre-enqueue work queues 420, and a pre-enqueue work queue arbiter 440. For illustrative purposes, the embodiment of FIG. 4 shows four (4) pre-enqueue work queues 430a, 430b, 430c, 430d in the set 420.

The first pre-enqueue work queue 430a as receives packet descriptors for the data packets from the ingress A0 130a (FIG. 1) and stores the packet descriptor for eventual arbitration and selection by the arbiter 440. Similarly, the second pre-enqueue work queue 430b receives and stores packet descriptors from the ingress A1 140a (FIG. 1); the third pre-enqueue work queue 430c receives and stores packet descriptors from the ingress B0 130b (FIG. 1); and the fourth pre-enqueue work queue 430d receives and stores packet descriptors from the ingress B1 130b (FIG. 1). These pre-enqueue work queues 430a, 430b, 430c, 430d buffer the packet descriptors from each ingress A0 130a, A1 140a, B0 130b, and B1 140b. Thus, up to this point in the description, the embodiment of FIG. 4 is similar to the embodiment of FIG. 2.

However, unlike the embodiment of FIG. 2, the embodiment of FIG. 4 allows the MMU 450 to drop data packets before they are enqueued to an egress queue. For example, if the MMU 450 determines that the egress queues for the data packets from ingress A1, ingress B0, and ingress B1 are in a discard state, then the MMU 450 drops the data packets from ingress A1, ingress B0, and ingress B1 by forwarding the respective packet descriptors to a delete context 460. Thus, only the data packet from ingress A0, which is not dropped by the MMU 450, is enqueued to its corresponding egress queue. For some embodiments, the determination of whether or not the egress queue is in a discard state can be made prior to the packet descriptors being stored in the pre-enqueue work queues 430b, 430c, 430d. For other embodiments, the MMU 450 can be configured to determine whether the corresponding egress queue is in a discard state when each of the packet descriptors is at the head of the pre-enqueue work queue 430b, 430c, 430d. Thus, the data packets that are destined for an egress queue in a discard state will be dropped by the MMU 450, while the other data packets will be enqueued because the MMU 450 has determined that those data packets are not destined for an egress queue in a discard state.

At each clock cycle, the arbiter 440, which is coupled to the pre-enqueue work queues 430a, 430b, 430c, 430d, selects a packet descriptor that is not dropped from one of the pre-enqueue work queues. And, the corresponding packet is enqueued to the egress A0 160a (FIG. 1) (or egress A1 170a (FIG. 1), or B0 160b (FIG. 1), or B1 170b (FIG. 1), depending on which egress queue is determined to be the corresponding egress queue for the selected data packet). For some embodiments, this can be done in a round-robin fashion. With this configuration, and given the illustrative data rates used in FIG. 1, the packet descriptors arrive at the pre-enqueue work queues 420 at a rate of about 2.8 Bpps, but the selected packet descriptor leaves the arbiter 440 at a rate of about 500 Mpps. As one can see from the embodiment of FIG. 4, the set of pre-enqueue work queues 420 coupled with an arbiter 440 readily permits scaling of the output-buffered switch by allowing the switch to decouple its data path from its control path.

The switch and/or the memory management unit (MMU) may be implemented in hardware, software, firmware, or a combination thereof. In the preferred embodiment(s), the switch and/or the MMU are implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the switch and/or the MMU are implemented in software or firmware that is stored in a memory and that is executed by a suitable instruction execution system.

Any process descriptions should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. For example, while specific data rates (e.g., 500 Mpps) are provided for illustrative purposes, one having skill in the art will appreciate that these data rates can increase or decrease without adversely affecting the scope of the claims. All such changes, modifications, and alterations should therefore be seen as within the scope of the disclosure.

What is claimed is:

1. A switch having a maximum ingress rate, the switch comprising:
    a first set of ingress packet-processing (PP) units;
    a first set of egress PP units having a maximum dequeue rate;
    a second set of ingress PP units;
    a second set of egress PP units having the maximum dequeue rate; and
    a memory management unit (MMU), comprising:
        pre-enqueue work queues configured to store packet descriptors associated with data packets, the pre-enqueue work queues comprising:
            a first set of pre-enqueue work queues, each being communicatively coupled to a corresponding one of the first set of ingress PP units;
            a second set of pre-enqueue work queues, each being communicatively coupled to a corresponding one of the second set of ingress PP units; and
        an arbiter configured to select a packet descriptor from one of the pre-enqueue work queues and enqueue, at each of a plurality of clock cycles, a data packet associated with the packet descriptor to one of the second set of egress PP units at an enqueing rate that is less than the maximum ingress rate and greater than the maximum dequeue rate.

2. The switch of claim 1, wherein the MMU is configured to:
    determine whether at least one of the egress PP units is in a discard state prior to enqueing the data packet; and
    enqueue the data packet to the at least one of the egress PP units when the at least one of the egress PP units is not in a discard state.

3. The switch of claim 2, wherein the MMU is configured to determine whether the at least one of the egress PP units is in a discard state prior to the packet descriptors being stored in the pre-enqueue work queues.

4. The switch of claim 2, wherein the MMU is configured to determine whether the at least one of the egress PP units is in a discard state when the packet descriptor is at a head of the pre-enqueue work queue.

5. The switch of claim 1, wherein the MMU is configured to:
    determine whether at least one of the egress PP units is in a discard state prior to enqueing the data packet; and
    enqueue the data packet when the at least one of the egress PP units is not in a discard state.

6. A switch having a maximum ingress rate, the switch comprising:
    a first set of ingress packet-processing (PP) units each including a plurality of output ports;
    a second set of ingress PP units each including a plurality of output ports;
    a first set of egress PP units each having a maximum dequeue rate and a plurality of input ports;
    a second set of egress PP units having the maximum dequeue rate and a plurality of input ports; and
    a first memory management unit (MMU) coupled to the output ports of the first and second sets of ingress PP units and the input ports of the first set of egress PP units, wherein
    the first MMU is configured to
        store a plurality of packet descriptors each associated with a packet received from the output ports of the first and second sets of ingress PP units;
        select at least a first packet descriptor from among the plurality of stored packet descriptors; and
        write, at each of a plurality of clock cycles, a data packet associated with the at least a first packet descriptor to at least one of the input ports of the first set of egress PP units such that data packets are enqueued at a rate less than the maximum ingress rate.

7. The switch of claim 6, wherein a number of the input ports of the first set of egress PP units is less that a number of the output ports of the first and second sets of ingress PP units.

8. The switch of claim 6, further comprising:
a second MMU coupled to the output ports of the first and second sets of ingress PP units and the input ports of the second set of egress PP units.

9. The switch of claim 8, wherein a number of the input ports of the second set of egress PP units is less that a number of the output ports of the first and second sets of ingress PP units.

10. The switch of claim 9, wherein the second MMU is configured to
store the plurality of packet descriptors each associated with a packet received from the output ports of the first and second sets of ingress PP units;
select at least a second packet descriptor from among the plurality of stored packet descriptors; and
write, at each of a plurality of clock cycles, a data packet associated with the at least a second packet descriptor to at least one of the input ports of the second set of egress PP units such that data packets are enqueued at a rate less than the maximum ingress rate.

11. A switch having a maximum ingress rate, the switch comprising:
a first set of ingress packet processors;
a first set of egress packet processors having a maximum dequeue rate;
a second set of ingress packet processors;
a second set of egress packet processors having the maximum dequeue rate; and
circuitry configured to:
store packet descriptors associated with data packets in pre-enqueue work queues, the pre-enqueue work queues comprising:
a first set of pre-enqueue work queues, each communicatively coupled to a corresponding one of the first set of ingress packet processors;
a second set of pre-enqueue work queues, each communicatively coupled to a corresponding one of the second set of ingress packet processors;
select a packet descriptor from one of the pre-enqueue work queues; and
enqueue, at each of a plurality of clock cycles, a data packet associated with the packet descriptor to one of the second set of egress packet processors at an enqueuing rate that is less than the maximum ingress rate and greater than the maximum dequeue rate.

12. The switch of claim 11, wherein the circuitry is configured to:
determine whether at least one of the egress packet processors is in a discard state prior to enqueing the data packet; and
enqueue the data packet to the at least one of the egress packet processors when the at least one of the egress packet processors is not in a discard state.

13. The switch of claim 12, wherein the circuitry is configured to determine whether the at least one of the egress packet processors is in a discard state prior to the packet descriptors being stored in the pre-enqueue work queues.

14. The switch of claim 12, wherein the circuitry is configured to determine whether the at least one of the egress packet processors is in a discard state when the packet descriptor is at a head of the pre-enqueue work queue.

15. The switch of claim 11, wherein the circuitry is configured to:
determine whether at least one of the egress packet processors is in a discard state prior to enqueing the data packet; and
enqueue the data packet when the at least one of the egress packet processor is not in a discard state.

* * * * *